3 Sheets—Sheet 1.

J. WILHELM.
PROCESS AND APPARATUS FOR REFINING SUGAR.

No. 181,231. Patented Aug. 15, 1876.

WITNESSES
E. H. Bates
George E. Upham.

INVENTOR,
James Wilhelm.
Gilmore, Smith & Co.
ATTORNEYS.

J. WILHELM.
PROCESS AND APPARATUS FOR REFINING SUGAR.
No. 181,231. Patented Aug. 15, 1876.
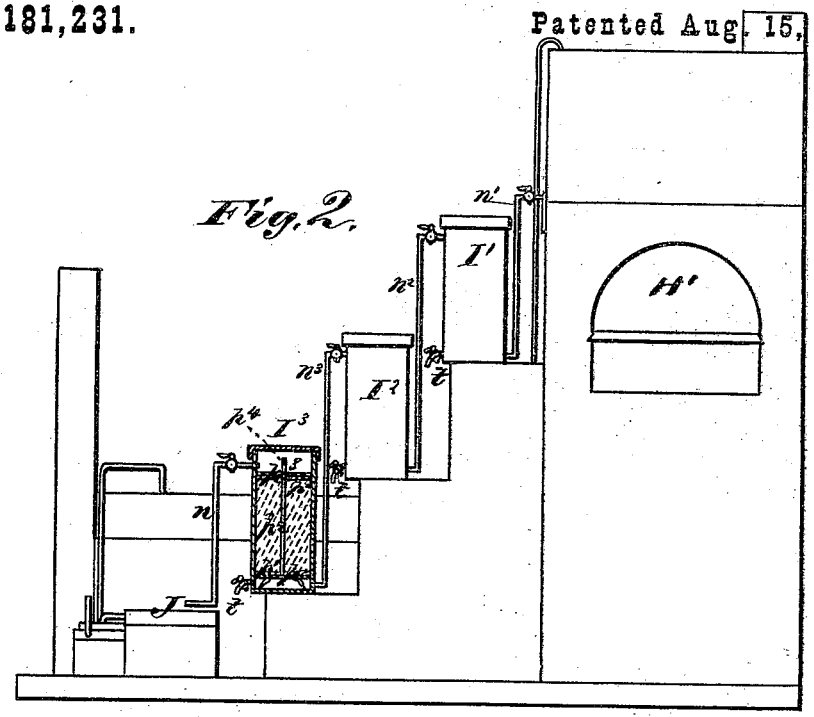
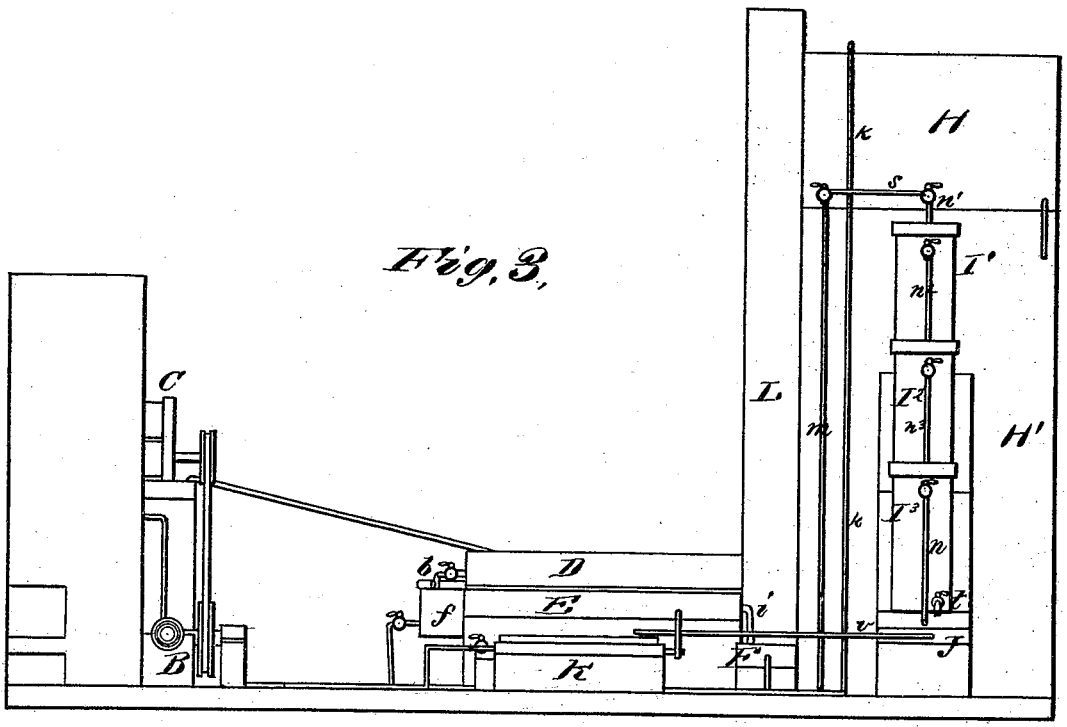

J. WILHELM.
PROCESS AND APPARATUS FOR REFINING SUGAR.

No. 181,231. Patented Aug. 15, 1876.

UNITED STATES PATENT OFFICE.

JAMES WILHELM, OF PITTSBURG, PENNSYLVANIA.

IMPROVEMENT IN PROCESSES AND APPARATUS FOR REFINING SUGAR.

Specification forming part of Letters Patent No. 181,231, dated August 15, 1876; application filed April 1, 1876.

*To all whom it may concern:*

Be it known that I, JAMES WILHELM, of Pittsburg, in the county of Allegheny and State of Pennsylvania, have invented a new and valuable Improvement in Sugar-Refiners; and I do hereby declare that the following is a full, clear, and exact description of the construction and operation of the same, reference being had to the annexed drawings, making a part of this specification, and to the letters and figures of reference marked thereon.

Figure 1:
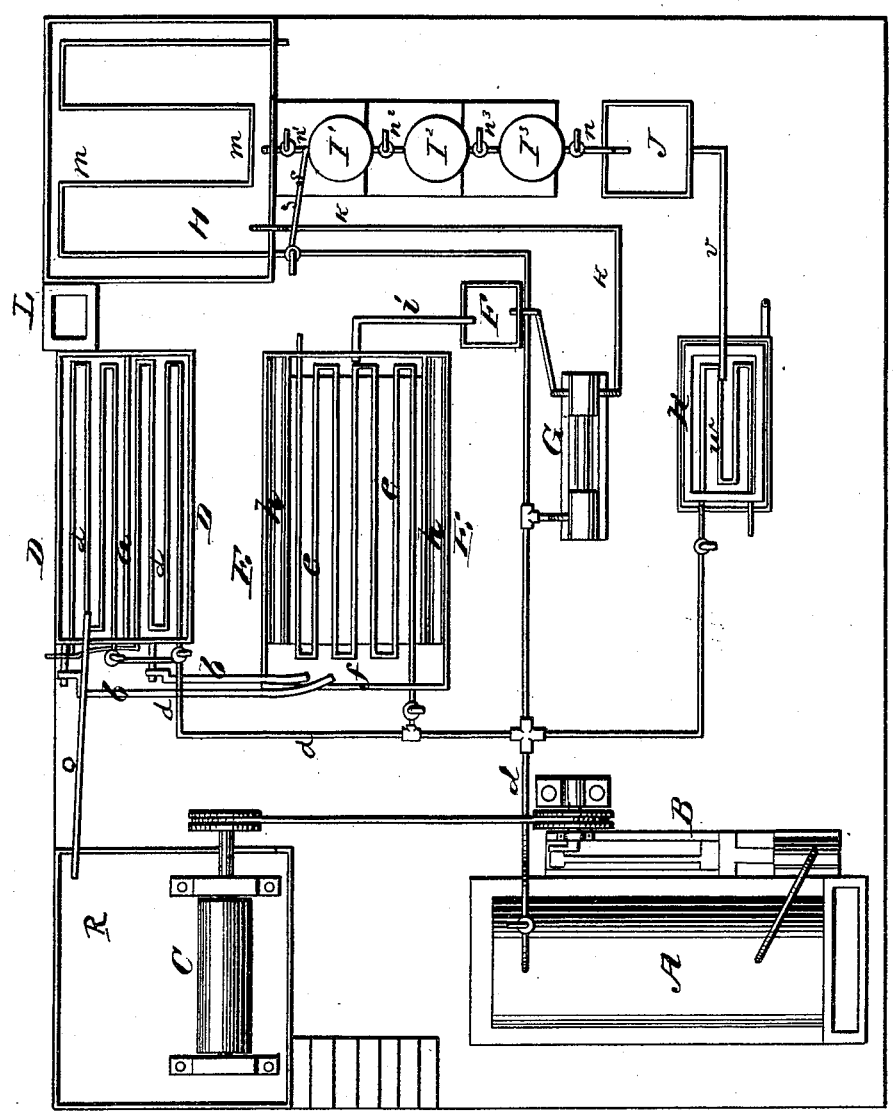
Figure 4:
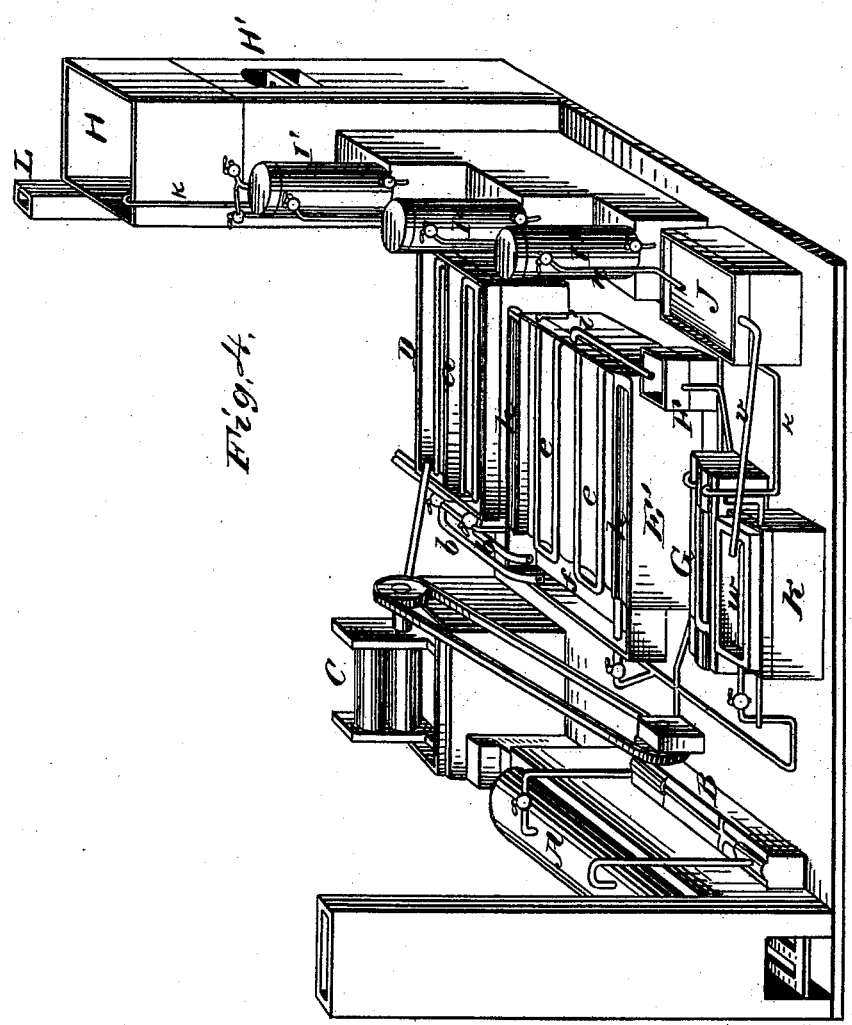

Figure 1 of the drawings is a representation of a plan view of my sugar-refiner, and Figs. 2 and 3 are elevations of the same. Fig. 4 is a perspective view thereof.

The nature of my invention consists in the construction and arrangement of an apparatus for refining sugar, as will be hereinafter more fully set forth.

In the annexed drawings, A represents the boiler; B, the engine; C, the crushing-mill, for crushing all kinds of cane; and D, the defecating-tanks. These tanks may be made of wood, or of any other suitable material, of any length, width, or depth to suit the capacity of the works. A longitudinal partition, $a$, makes two tanks, each of which has a swinging pipe, $b$, leading to the first evaporator E. After one of the tanks D is filled, the cane-juice passing from the receptacle R through the pipe $o$ into one of the divisions of the tank D, the pipe $o$ may be shifted from one to the other divisions of the tank D, formed by the partition $a$, and either or both of the swinging pipes $b$ may be turned down to connect with the evaporator, when the divisions of the tank are filled, to convey the cane-juice to the evaporator E.

When one of the tanks is full of coarse juice or any diluted sugar or sirup, the steam is turned on to pass through pipes $d$ in the bottom of defecator until the mass is heated to from 75° to 100°, or as hot as desired. I then introduce lime in milk form into the juice or dilute sirup until all the free acids are neutralized, which is known by the litmus-paper test. After the acids are neutralized I introduce stearic acid in solution, or stearine, which is liquefied by heat, which I continue to add until the litmus-paper shows an acid tinge again, said stearic acid or stearine being put in hot, and forming salts with the lime or other bases in the juice. The proportion of stearine to be introduced into the juice is determined by the litmus-paper test showing an acid tinge, which is a sure criterion under all circumstances.

E represents the semi-sirup evaporator. This can be made so as to run by steam or fire. The steam-pan is set on a wooden or brick base, E'. The bottom and sides may be made of copper, galvanized iron, or other metal. When steam is to be used, the bottom of the pan is made corrugated, and steam-pipes $e$ rest in the corrugations.

At the front end of the evaporator E is a depression, $f$, which will be kept comparatively cool, and serves as a receptacle for scum, which is easily removed. On the sides of the evaporator are troughs or gutters $h\ h$, which may be made of wood, or of the same material as the evaporator. These troughs are calculated to catch the overflow, which is principally scum, and carry it forward to the front depression $f$, making the pan a self-skimming pan. These troughs $h$ may be placed on the inside or outside of the evaporator, at the discretion of the operator. When fire is used instead of steam, the bottom of the pan E is made flat, but in all other respects the same as above described.

The defecating-tanks and evaporator may be provided with furnaces, to be connected with the smoke-stack L. The juice or dilute sirup passes from the defecator D into the evaporator E in a continuous stream, regulated by the operator by means of the swinging pipes $b$, and passes off continually through the swinging pipe $i$ at the rear end of evaporator, at a density of from 14° to 18°, (saccharometer test,) into the receiving-tank F, from whence it is elevated by means of pumps G, through the elevating-pipe $k$, into the semi-sirup tank H. In this tank the semi-sirup must be kept at a temperature of 65° to 80°. The tank H may be made of wood, with the same material as the evaporator for bottom, or it can be all of metal. It is heated by means of steam-pipes $m$, the same as the defecator D, or by a furnace, H', communicating with the smoke-stack L.

$I^1\ I^2\ I^3$ represent filters, made of metal or wood—round, square, or of other desired shape.

The semi sirup passes through a pipe, $n^1$, from the tank H into the lower end of the first filter $I^1$. The filters are all alike in construction, each being, a short distance above its bottom, provided with a perforated false bottom, $p$, covered with porous cloth $p^1$, on which the carbon or bone-black $p^2$ rests. The semi-sirup enters below and passes or flows upward through the false bottom and carbon to the top. On top of the carbon rests a perforated and removable top, $p^3$, covered on the lower side with porous cloth $p^1$, to keep the carbon from mixing as the flow passes into the pipe $n^2$, descending into filter $I^2$. It then passes up through said filter; thence through a pipe, $n^3$, to filter $I^3$, and up to the top thereof; thence through a pipe, $n$, into the filtered-sirup tank J.

The sirup may be made to flow downward as well as upward through the filters. All that is necessary is to reverse the connecting-pipes.

A rod, $p^4$, passes through the false bottom $p$ and top $p^3$, as shown. When the bone-black becomes gummed and unfit for use, (until re-burned,) it can be raised out in mass by lifting out the false bottom and all by means of the rod $p^4$ and recharged with fresh carbon.

All the connecting-pipes should be provided with stop-cocks for regulating the flow of the sirup.

A connection, $s$, is made with the steam-pipe that enters the tank H to the pipe $n^1$, so as to force steam through the carbon when necessary, should the flow stop or the carbon become clogged; also, when done at night, steam can be used in forcing out all sirup remaining, and wash the carbon and the filters.

One, two, three, or more filters may be used in this combination, at the discretion of the operator.

At the extreme bottom of each filter an opening, $t$, is made to draw off any precipitate that may accumulate.

From the tank J the filtered sirup is drawn through pipe $v$ to the finisher $k$, in batches or quantities to suit the operator. This finisher is made with corrugated or plain bottom, with steam-pipes $w$ thereon. The ends and bottom are made of copper or galvanized iron, and the sides may be made of wood. The sides may be made flaring or perpendicular, as desired. The semi-sirup is here finished to any consistency the operator may desire. The finisher may also be run by furnace, as shown.

The various steam-pipes described are connected with the boiler A, and stop-cocks are introduced at suitable points, so as to let on or shut off the steam at any portion of the apparatus, as required.

I am aware that a carbon filter provided with a perforated top and false bottom, covered with porous cloths, has heretofore been employed, and I therefore lay no claim to such invention; but my improvement consists in providing a rod attached to the false bottom for the purpose of removing the carbon.

What I claim as new, and desire to secure by Letters Patent, is—

1. The tank D, provided with the partition $a$, steam-pipes $d$ $d$, and swinging pipes $b$ $b$, leading into the evaporator E, in combination with the reservoir R and pipe $o$, substantially as described, and for the purpose set forth.

2. The process of refining sugar, which consists in first introducing milk of lime into the juice or dilute sirup, and then adding stearic acid or stearine, substantially as described, and for the purpose set forth.

3. The filter herein described, having the perforated false bottom $p$, carbon $p^2$, provided with a passage, through which extends the rod $p^4$, perforated top $p^3$, porous cloths $p^1$ $p^1$, and pipe $n^1$, leading into the bottom of the filter, substantially as and for the purpose described.

4. The filter herein described, provided with the pipe $n^1$, in combination with the sectional pipe $s$, connecting the steam and sirup pipes, substantially as described, and for the purpose set forth.

In testimony that I claim the above I have hereunto subscribed my name in the presence of two witnesses.

JAMES WILHELM.

Witnesses:
 G. W. HAMMER,
 W. S. YATES.